United States Patent [19]

Sugiyama et al.

[11] 4,241,255

[45] Dec. 23, 1980

[54] ULTRAVIOLET RAY PROJECTOR

[75] Inventors: Mitsuru Sugiyama, Noda; Yoshitake Fukui, Koshigaya; Yoshio Yazaki, Chofu; Haruaki Ono; Shusaku Nakanishi, both of Nihonbashi, all of Japan

[73] Assignees: Dainichiseika Color & Chemicals Mfg. Co., Ltd.; Lonseal Corporation; Orc Manufacturing Co., Ltd., all of Tokyo, Japan

[21] Appl. No.: 2,601

[22] Filed: Jan. 11, 1979

[30] Foreign Application Priority Data

Feb. 2, 1978 [JP] Japan .................................. 53/11245
Feb. 2, 1978 [JP] Japan .................................. 53/11246

[51] Int. Cl.[3] .................................................. G01J 1/00
[52] U.S. Cl. .................................. 250/504 R; 250/503
[58] Field of Search ............... 250/493, 494, 503, 504, 250/505, 514; 34/4; 313/113, 114

[56] References Cited

U.S. PATENT DOCUMENTS

| | | | |
|---|---|---|---|
| 1,813,383 | 7/1931 | Chesney et al. | 250/504 |
| 2,057,776 | 10/1936 | Groven | 34/4 |
| 3,819,929 | 6/1974 | Newman | 34/4 |
| 3,831,289 | 8/1974 | Knight | 250/504 |
| 3,967,385 | 7/1976 | Culbertson | 34/4 |
| 4,015,340 | 4/1977 | Treleven | 250/504 |
| 4,025,795 | 5/1977 | Lackore et al. | 250/504 |

*Primary Examiner*—Bruce C. Anderson
*Attorney, Agent, or Firm*—Oblon, Fisher, Spivak, McClelland & Maier

[57] ABSTRACT

An ultraviolet ray projector comprises a reflector; a mercury lamp disposed in the reflector; a casing having one opening port which receives the reflector and the mercury lamp; a holder connected on an outer wall of the casing.

The opening port of the casing has a shielding mechanism for controlling diffusion of ultraviolet rays.

5 Claims, 6 Drawing Figures

ULTRAVIOLET RAY PROJECTOR

BACKGROUND OF THE INVENTION

FIELD OF THE INVENTION

The present invention relates to an ultraviolet ray projector. More particularly, it relates to an ultraviolet ray projector for hardening a paint for a short time by irradiating ultraviolet rays on a coated surface of an ultraviolet ray-curable paint such as various resin coating compositions.

2. DESCRIPTION OF THE PRIOR ARTS

A soft synthetic resin sheet having long length and width is laid on a floor of a passenger train and buildings. The floor sheet has disadvantages to form cigarette spot which is caused by a burning cigarette end and to form heel-mark which is black trace caused by strong friction of rubber heel.

In order to overcome these disadvantages, it has been proposed to coat a transparent acrylic resin on the surface of the floor sheet and to harden the surface of the floor sheet.

The former is effective for preventing the heel-mark but is not effective for preventing the cigarette spot. Moreover, when it is coated in thick thickness, it takes a long time for drying the coated layer. Accordingly, the former has not been practically applied.

The latter is relatively effective for preventing the cigarette spot, but it has fatal disadvantages as a floor sheet because of slippery and inferior feeling. Accordingly, the latter has not been practically applied.

An ultraviolet ray-curable paint which has been recently developed, can be coated in thick thickness and can be hardened for a short time by irradiating ultraviolet rays. The resulting coated layer is soft but prevents both of the heel-mark and the cigarette spot. Accordingly, the application of the ultraviolet ray-curable paint is significantly effective for overcoming the disadvantages of the heel-mark and the cigarette spot.

The ultraviolet ray-curable paint is a paint which is reacted by an irradiation of ultraviolet rays to harden from liquid to solid. The hardening is performed only for a short time such as several tens seconds. Accordingly, it is remarkably advantageous for a continuous surface treatment of the floor sheet.

When the coated floor sheet is laid on a floor of a building, the coated floor sheet is bonded with an adhesive composition. It is important to consider a treatment of joints between the floor sheets laid on the floor. In usual, a welding processing with a welding rod has been applied to prevent an immersion of water and to prevent a joint opening caused by contraction of the floor sheet. In the case of the floor sheet coated with the ultraviolet ray-curable paint, the welding processing is also required. After the welding processing, it is necessary to coat the ultraviolet ray-curable paint on the joint and to harden it by irradiating ultraviolet rays.

It has not been considered to apply an ultraviolet ray-curable paint in such manner, and accordingly an ultraviolet ray projector for hardening the ultraviolet ray-curable paint coated on joints of the floor sheets has not been considered.

SUMMARY OF THE INVENTION

It is an object of the present invention to provide an ultraviolet ray projector for hardening a coated ultraviolet ray-curable paint by irradiating ultraviolet rays.

The foregoing and other objects of the present invention have been attained by providing an ultraviolet ray projector which comprises a reflector; a mercury lamp disposed in the reflector; a casing having one opening port which receives the reflector and the mercury lamp; a holder connected on an outer wall of the casing; and a shielding mechanism for minimize leakage of ultraviolet rays to undesired peripheral environment.

DETAILED DESCRIPTION OF THE PREFERRED EMBODIMENTS

Figure 1:
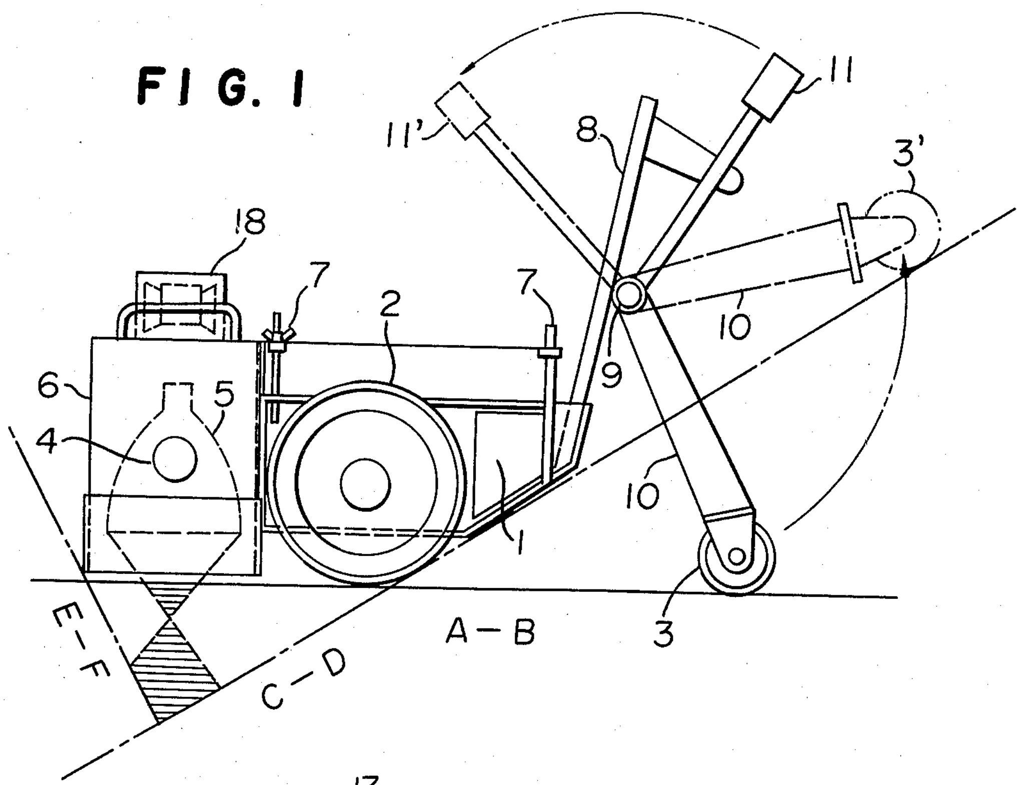
FIG. 1 is a side view of one embodiment of the ultraviolet ray projector of the present invention.

Referring to the drawings, one embodiment of the ultraviolet ray projector of the present invention will be illustrated.

A casing (6) receiving a tubular mercury lamp (4) and a reflector (5) is hold on a truck (1) equipped with main wheels (2) and sub-wheels (3) and the casing (6) is fixed on the truck (1) with screws (7).

Movable frames (9) holding a handle(8) at both sides are provided and the sub-wheels (3) are connected through supporters (10) at both sides. The movable frames (9) can be turned by the handle (11) whereby the position of the sub-wheels (3) can be vertically moved.

The tubular mercury lamps include normal tubular mercury lamp, metal halide lamp, xenon lamp and ultraviolet ray chemical lamp.

As shown by the full line in FIG. 1, when the main wheels and the sub-wheels are contacted with the floor (A)-(B), the irradiating surface is parallel to the floor. When the handle (11) is turned to the position (11') shown by the broken line, the sub-wheels (3) are turned to the position (3'), whereby the truck is slant to contact with the floor along a predetermined elevation angle (C)-(D). The irradiation angle is changed depending upon the elevation angle whereby a desired irradiation can be attained as shown by the hatching even though near vertical surface (E)-(F) at wall side or pole side of the floor.

Figure 2:
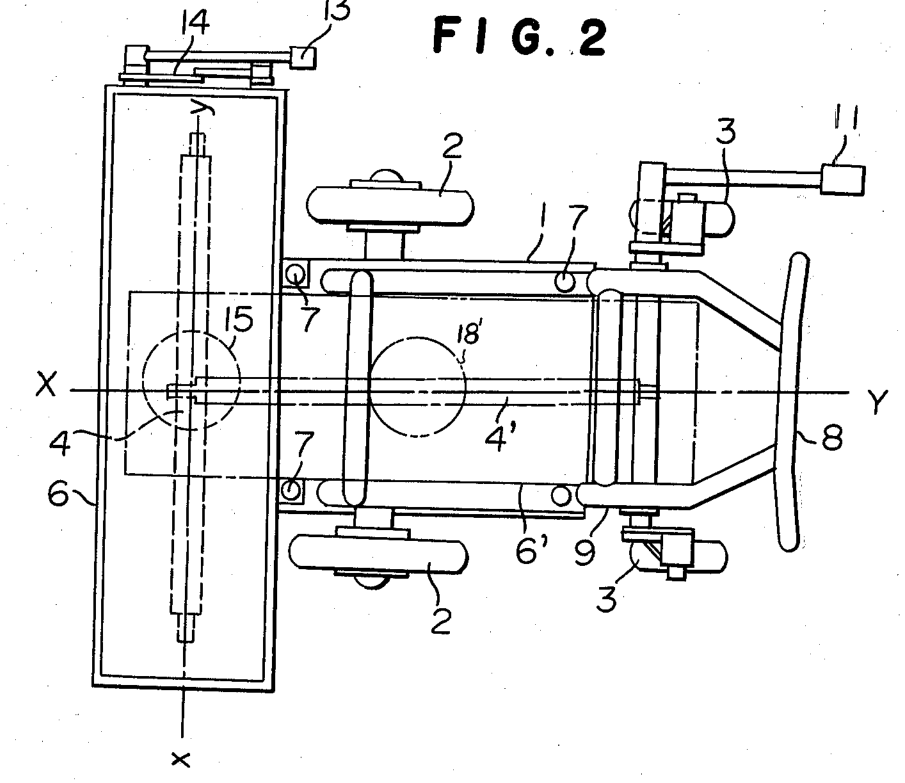
FIG. 2 is a plan view of the embodiment of FIG. 1.

As shown in FIG. 2, the casing (6) is held at a top of the truck and the tubular axis (x)-(y) of the mercury lamp is disposed to perpendicular to the center line (X)-(Y) of the truck, whereby the irradiation in broad width can be attained.

When the irradiation in narrow width is required as a joint processing, the casing can be fitted so as to give the tubular axis of the mercury lamp (x)-(y) in parallel to the center line (X)-(Y) of the truck. The irradiation of ultraviolet rays in high efficiency can be attained by adjusting the tubular axial line.

The reflector (5) can be a desired concave mirror having elliptic form, parabola form, or semi-spherical form which is selected depending upon the purpose and usage.

Figure 4:
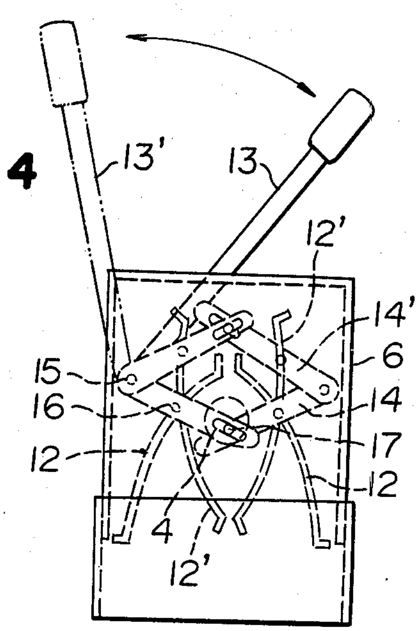
FIGS. 3 and 4 are schematic views of shutter mechanism of the ultraviolet ray projector.
Figure 3:
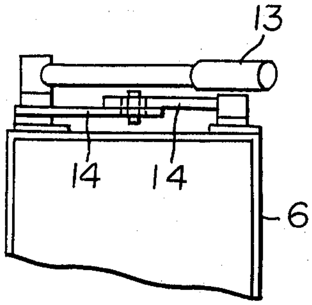

It is especially effective to use the reflector shown in FIG. 4 which has two divided turnable mirrors (12) (divided along the tubular axis) which form a shutter mechanism for opening and shutting the irradiation of ultraviolet rays by an operation of a lever (13).

The mercury lamp used in the ultraviolet ray projector is preferably a high capacity and high pressure type mercury lamp. When such mercury lamp is once extinguished, it is not easy to lighten again for a short time from feeding a current.

However, when the reflectors (12) having the structure of FIG. 4 are used, the reflector can be shifted to the closing position (12') by the operation lever (13) whereby ultraviolet rays are shielded and the irradiation of the ultraviolet rays can be stopped without turning off the mercury lamp.

The shutter mechanism comprises a movable arm (14) mounted on an end of a rotary shaft (15) connected to the operation lever (13) and the other movable arm (14) jointed with a fitting (17) under interlocking each other.

The divided reflectors (12) are respectively fitted to the movable arms (14) (14) with each fitting, under the movable condition. The movable arms (14) (14) are upwardly shifted by turning the operation lever (13) from the position shown by the full line to the position shown by the broken line, whereby the reflectors (12) are upwardly shifted and closed their opening port to shield the ultraviolet rays of the mercury lamp (4).

The operation lever (13) and the movable arm (14) (14) are connected at a side of the casing (6) so as to operate easily when required.

It is preferable to provide an air cooling type cooling device (18) for preventing overheat of the casing because the high capacity and high voltage type arc lamp especially mercury lamp is equipped. A suction type cooling device is especially preferable.

Rubber wheels are usually used for the main wheels and the sub-wheels. It is possible to use metal wheels so as to run the truck on a pair of rails above the coated part in a case of automatic driving by a motor.

It is preferable to combine a paint feeder and a roll coater type or spray type coating device with the ultraviolet ray projector as additional equipments. When the additional equipments of the paint feeder and the coating device are equipped front of the casing (6), the ultraviolet ray-curable paint can be coated and hardened by irradiating ultraviolet rays to attain the purpose of the coating for a short time.

Figure 5:
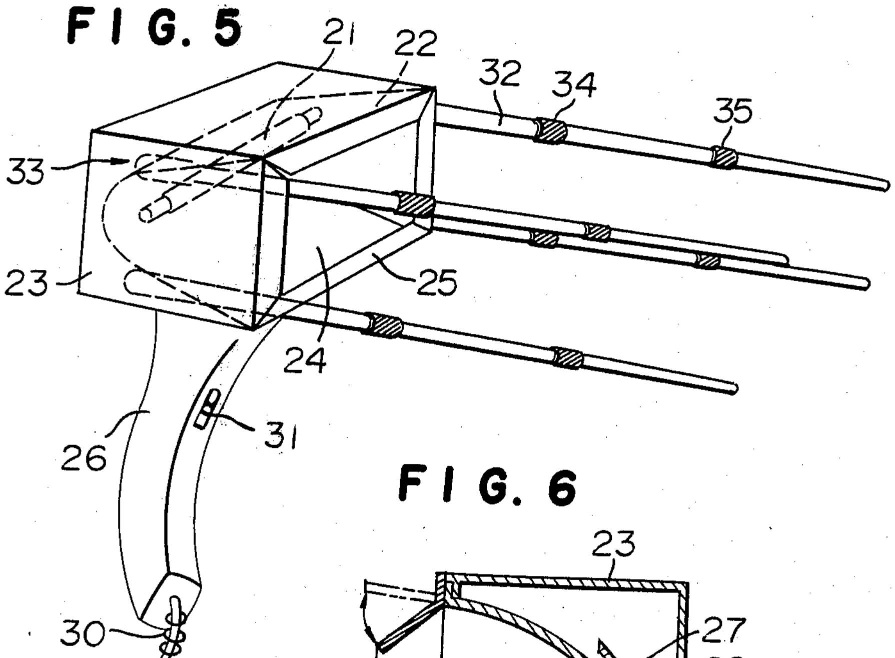
FIG. 5 is a schematic view of the other embodiment of the ultraviolet ray projector of the present invention.
Figure 6:
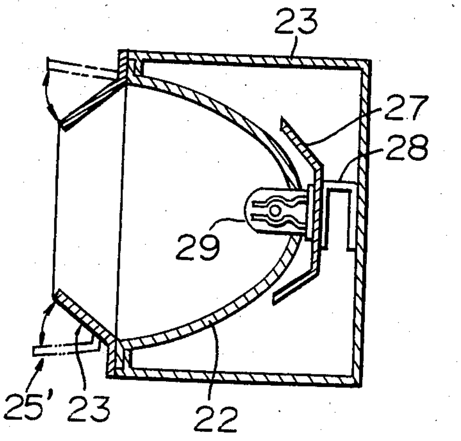
FIG. 6 is a sectional side view of the embodiment.

The other embodiment of the handy ultraviolet ray projector will be further illustrated referring to FIGS. 5 and 6.

In FIG. 5, a mercury lamp (21) is disposed at a focus of a reflector (22) and they are received in a casing (23). A peripheral shielding mechanism (25) for controlling diffusion of ultraviolet rays is provided at the peripheral part of an opening port (24) of the casing (23). The shielding mechanism (25) can be controlled by turning plates at a desired angle as (25), (25'). The shielding mechanism (25) can be fixed eaves and can be selected depending upon the purpose and usage. The reflector can be two divided reflectors which are turnable to shut and to open as disclosed in FIG. 4.

A holder (26) is connected on an outer wall of the casing (23) whereby the projector can be handy to irradiate ultraviolet rays at a desirable angle from a desirable distance to the coated layer.

A flexible wire (30) is wired through the holder (26) and is connected to a power source (not shown) and the mercury lamp is switched by a switch (31) mounted on the holder (26).

It is preferable to connect supporters (32) for adjusting a distance for the irradiation at sides of the casing (23) with fittings (33). The adjustment of the length of the supporters that is the distance for the irradiation, is carried out by adjusting screws (34), (35). Small wheels can be fitted at the tops of the supporters (32).

In FIG. 6, mouth piece clips (29) for holding both end of the mercury lamp are mounted at the bottom of the reflector (22). When ultraviolet rays leaks from the bottom of the reflector (22), it is preferable to compensate by a sub-reflector (27). The reflector and the lamp are mounted on the casing by fittings (28). A front glass is not disposed at the opening port of the casing to radiate directly ultraviolet rays through the opening port (24). Accordingly, ultraviolet rays are not absorbed in a glass plate to improve efficiency.

The shielding mechanism (23) is to prevent the irradiation of ultraviolet rays to eyes and to define the irradiated area.

The reflector (22) can be suitable form such as elliptical form, parabola form, semi-circular form in sectional view depending upon sizes and shapes of the casing and the irradiated part. A reflector having higher reflecting efficiency is suitable.

The mercury lamp is preferably one having characteristics suitable for the usage to irradiate enough ultraviolet rays to harden the ultraviolet ray-curable paint and is simply used by connecting to a plug socket of a power voltage of 100 Volt.

Even though the mercury lamp is a small size mercury lamp for the handy projector, it is preferably a thick quartz tube and it contains a small quantity of mercury for generating desired ultraviolet radiation and has a potential gradient of 5 to 30 V/cm and a wall load of 5 to 25 W/cm$^2$.

A cooling means for preventing overheat can be equipped if desired.

The handy ultraviolet projector can be easily operated to irradiate any place for desired area from desired distance depending upon the kind of the coated layer and the area of the coated layer.

In accordance with the present invention, suitable irradiation of ultraviolet rays can be attained without any difficulty in high efficiency and in simple operation whereby the joint of the soft resin floor sheets can be easily treated with the ultraviolet ray-curable paint to provide high cigarette spot resistance and high heelmark resistance and also small parts and articles having complicated shape and walls having convex and concave can be easily treated with the ultraviolet ray-curable paint.

What is claimed is:

1. An ultraviolet ray projector device for use in curing paint which comprises:
   - an elongated reflector;
   - a tubular ultraviolet lamp disposed in said reflector;
   - an elongated casing having an opening port in one side, said reflector and said ultraviolet lamp being disposed in said casing;
   - a truck frame, said casing being attached to said truck frame;
   - a pair of main wheels rotatably attached to said truck frame, said pair of main wheels having a first common axis of rotation;
   - at least one elongated support member having a first end and a second end, said first end being pivotably attached to said truck frame, said elongated support member pivoting about a second axis which is parallel to said first axis; and at least one sub-wheel rotatably attached to said second end of said elongated support member;

whereby the elevation angle of the ultraviolet rays produced by said tubular lamp relative to a work surface and the distance from said tubular lamp to said work surface is controlled by pivoting said elongated support member about said second axis of rotation.

2. An ultraviolet ray projector device for use in curing paint as recited in claim 1, wherein:

said casing is attached to said truck frame such that an axis passing through said tubular lamp is parallel to said first axis of rotation.

3. An ultraviolet ray projector device for use in curing paint as recited in claim 1, wherein;

said casing is attached to said truck frame such that an axis passing through said tubular lamp is perpendicular to said first axis of rotation.

4. An ultraviolet ray projector device for use in curing paint as recited in claim 1, wherein said reflector comprises:

a pair of mirrors, said mirrors each being rotatable about axes parallel to an axis passing through said tubular lamp; and means for rotating said pair of mirrors such that said mirrors alternately form a reflective surface and a shutter mechanism.

5. An ultraviolet ray projector device for use in curing paint as recited in claim 1, which further comprises:

driving means fo propelling said main wheels.

* * * * *